W. O. SNELLING.
MANUFACTURE OF ACIDS.
APPLICATION FILED JULY 17, 1920.
1,430,035. Patented Sept. 26, 1922.
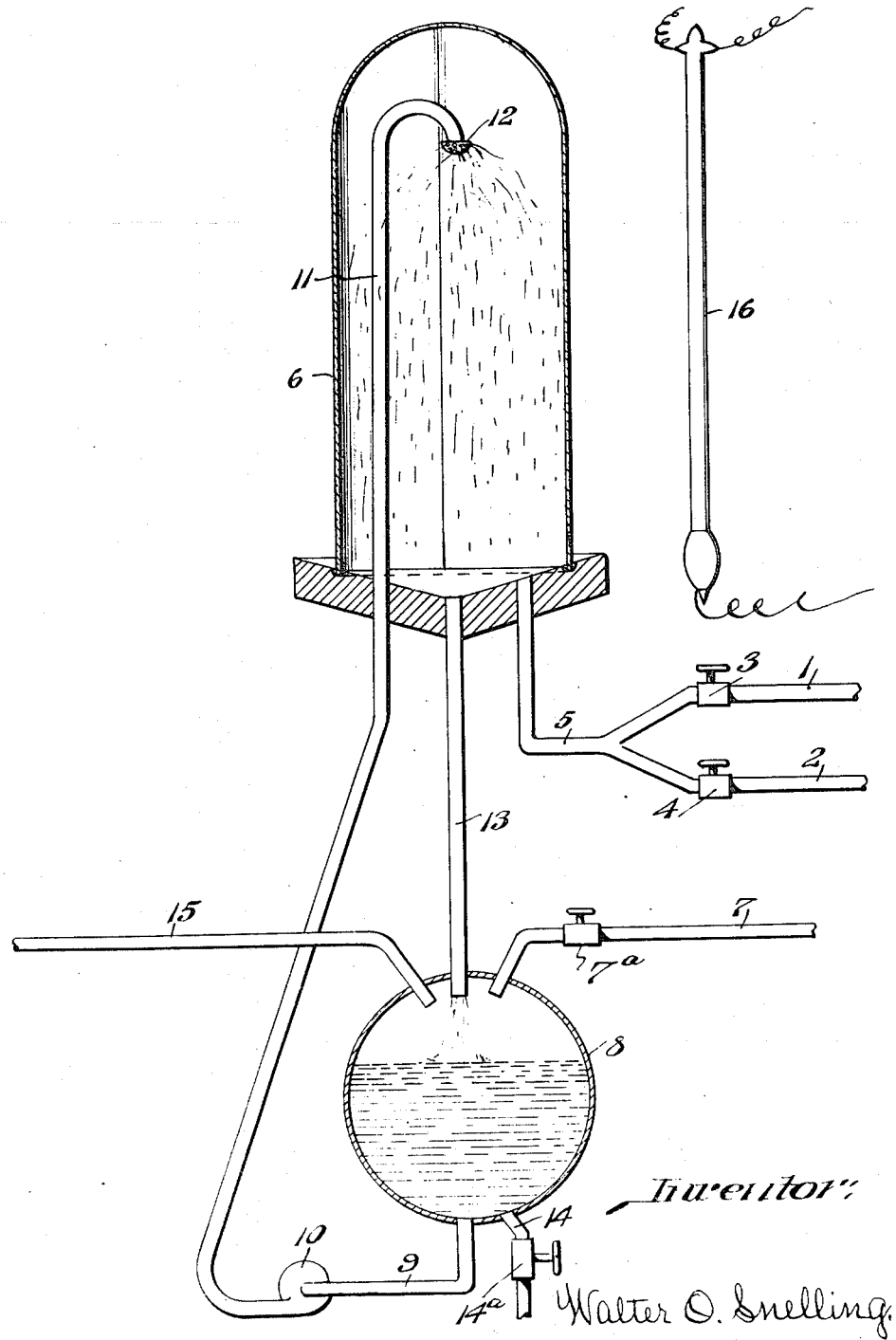
Inventor
Walter O. Snelling.

Patented Sept. 26, 1922.

1,430,035

UNITED STATES PATENT OFFICE.

WALTER O. SNELLING, OF ALLENTOWN, PENNSYLVANIA.

MANUFACTURE OF ACIDS.

Application filed July 17, 1920. Serial No. 397,112.

*To all whom it may concern:*

Be it known that I, WALTER O. SNELLING, a citizen of the United States, residing at Allentown, in the county of Lehigh and State of Pennsylvania, have invented certain Improvements in the Manufacture of Acids, of which the following is a specification.

My invention relates to improvements in the manufacture of acids, and more particularly relates to an improved method of preparing hydrochloric acid from chlorine, through the use of light as a catalyst.

It has long been known that chlorine and sulfur dioxide will react in the presence of actinic rays to form sulfuryl chloride in accordance with the following reaction:

$$SO_2 + Cl_2 = SO_2Cl_2$$

It is also well known that sulfuryl chloride undergoes reaction with water to form sulfuric acid and hydrochloric acid in accordance with the following reaction:

$$SO_2Cl_2 + 2H_2O = 2HCl + H_2SO_4$$

Previous efforts to prepare sulfuryl chloride from chlorine and sulfur dioxide have shown this reaction to go on rather slowly, thus requiring a very large reaction space for the production of any considerable quantity of the sulfuryl chloride, and it has also been found that the reaction between sulfuryl chloride and water is relatively slow, the sulfuryl chloride ionizing only slightly, and not entering into vigorous reaction with water under normal conditions. This relative slowness of the two reactions has tended to greatly restrict their commercial application in the manufacture of sulfuric and hydrochloric acids.

I have discovered that if the two reactions are permitted to proceed simultaneously, instead of the two steps being separately carried out, both reactions are accelerated to a very marked degree, so that a considerable production of hydrochloric and sulfuric acids can be obtained from apparatus of relatively small size, thus enabling sulfuric and hydrochloric acids to be produced commercially by the use of relatively simple and inexpensive plant equipment.

The accompanying illustration shows one form of apparatus suitable for use in the preparation of hydrochloric and sulfuric acids in accordance with my present invention, 1 being a pipe connected to any suitable source of chlorine, and 2 being a similar pipe connected to a suitable source of sulfur dioxide, both of these materials being preferably available in the gaseous state. 3 is a regulating valve, to control the amount of chlorine passing through the pipe 1, and 4 is a similar regulating valve controlling the amount of sulfur dioxide passing through pipe 2. 5 is a pipe connecting valves 3 and 4, this pipe passing to a reaction vessel 6, a vessel of the kind described in my pending application Serial No. 132,869 being particularly suitable. 7 is a pipe connected to a supply of water. 7ª being a valve to control the amount of water supplied. 8 is a tank, and 9 is a pipe connecting this tank with pump 10. 11 is a pipe leading from pump 10 to reaction vessel 6, and 12 is a spray nozzle at the end of pipe 11. 13 is a pipe extending from reaction vessel 6 to tank 8, and 14 is a pipe for withdrawing liquid from tank 8, the amount of liquid withdrawn being controlled by a valve 14ª. 15 is a pipe, through which hydrochloric acid gas is conducted from vessel 8, this hydrochloric acid gas being absorbed in water to form muriatic acid, or being utilized in any other suitable way. 16 is a source of actinic rays, a mercury vapor lamp being particularly suitable.

In the operation of the apparatus described chlorine and sulfur dioxide are supplied from pipes 1 and 2 through regulators 3 and 4 and pass through pipe 5, where mixing occurs. This mixing may be assisted by providing this pipe with a series of baffles. The chlorine and sulfur dioxide, mixed preferably in equal volumes, enter reaction chamber 6, and under the influence of the actinic rays combine to form sulfuryl chloride. Water or dilute sulfuric or hydrochloric acid is atomized or sprayed into reaction vessel 6 through nozzle 12, and comes in intimate contact with the sulfuryl chloride as it is formed, and leads to its rapid decomposition into sulfuric acid and hydrochloric acid. In first starting the apparatus I find it of advantage to fill tank 8 about two thirds full of a mixture of dilute hydrochloric and sulfuric acids. Water alone may be used, but more satisfactory results are obtained through the use of a mixture of dilute acids. The mercury vapor light 16 is put in operation, and the dilute acid in tank 8 is circulated through pipe 9, pump 10, pipe 11, and spray nozzle 12. The dilute acid passes through reaction vessel 6 as a fine spray, the dilute acid then passing back to tank 8 through pipe 13. Chlorine gas and sulfur dioxide gas in equal volumes are now admitted from pipes 1 and 2, the amount of these gases admitted being controlled by valves 3 and 4. The chlorine and sulfur dioxide become thoroughly mixed in passing through pipe 5, and in this well-mixed condition enter reaction vessel 6. The combined influence of the actinic rays from mercury vapor light 16 and the spray of dilute acid from spray nozzle 12 is to cause the rapid formation of sulfuryl chloride and its decomposition to hydrochloric and sulfuric acids. These acids serve to continually strengthen the original dilute acid circulated through pipe 9, pump 10, pipe 11, nozzle 12, reaction vessel 6 and pipe 13. After running for a short time, the acid in tank 8 becomes sufficiently strong for use, and portions are then intermittently or continuously drawn off through pipe 14 and valve 14$^a$, a corresponding amount of water being admitted through pipe 7 and valve 7$^a$. Hydrochloric acid gas begins to pass off through pipe 15 as soon as the sulfuric acid in tank 8 becomes quite concentrated. With sufficiently strong illumination the formation of the sulfuryl chloride and its decomposition to sulfuric and hydrochloric acids may be caused to proceed at a very rapid rate, so that a relatively small reaction vessel is sufficient for the preparation of large quantities of acid.

In the absence of suitable illumination, the reaction which goes on in the reaction vessel is very slight, the tendency of chlorine to combine with sulfur dioxide under these conditions being apparently too slight to produce more than very small amounts of sulfuryl chloride, and the production of hydrochloric and sulfuric acids without illumination is accordingly practically nil. With increasing illumination the combination of the chlorine and sulfur dioxide to form sulfuryl chloride, and the decomposition of this sulfuryl chloride to hydrochloric and sulfuric acids goes on with increasing rapidity, and apparently at a much more rapid rate than the rate at which the illumination is increased. With powerful illumination, such as is obtained from a number of mercury vapor lights surrounding the reaction vessel, sulfuric and hydrochloric acids can be produced in large amounts, the efficiency of the apparatus increasing very rapidly when the concentration of actinic rays is high.

It will be evident that many equivalents may be used, without departing from the spirit of my invention. Other halogens, and bromine in vapor form in particular, behave in a similar manner to chlorine when treated under the conditions described, and accordingly my invention affords a convenient means of obtaining hydrobromic acid. It will also be evident that although the type of apparatus described forms a convenient means for carrying out my invention, yet many other forms of apparatus may be used with similar success. Accordingly no limitations should be placed upon my invention, except such as are included in the appended claims.

I claim:

1. The process which comprises exposing a mixture of a halogen and sulfur dioxide to actinic rays in the presence of a spray of an aqueous fluid.

2. The process which comprises irradiating a mixture of sulfur dioxide and chlorine in the presence of a spray of aqueous fluid.

3. The process of preparing hydrochloric acid and sulfuric acid which comprises exposing a mixture of chlorine and sulfur dioxide to actinic rays in the presence of a spray of an aqueous fluid.

4. In the preparation of acids, the process which comprises accelerating the reaction between chlorine and sulfur dioxide by the simultaneous action of actinic rays and a moving body of an aqueous fluid.

In testimony whereof, I have hereunto subscribed my name this 24th day of May, 1920.

WALTER O. SNELLING.